Patented Apr. 24, 1928.

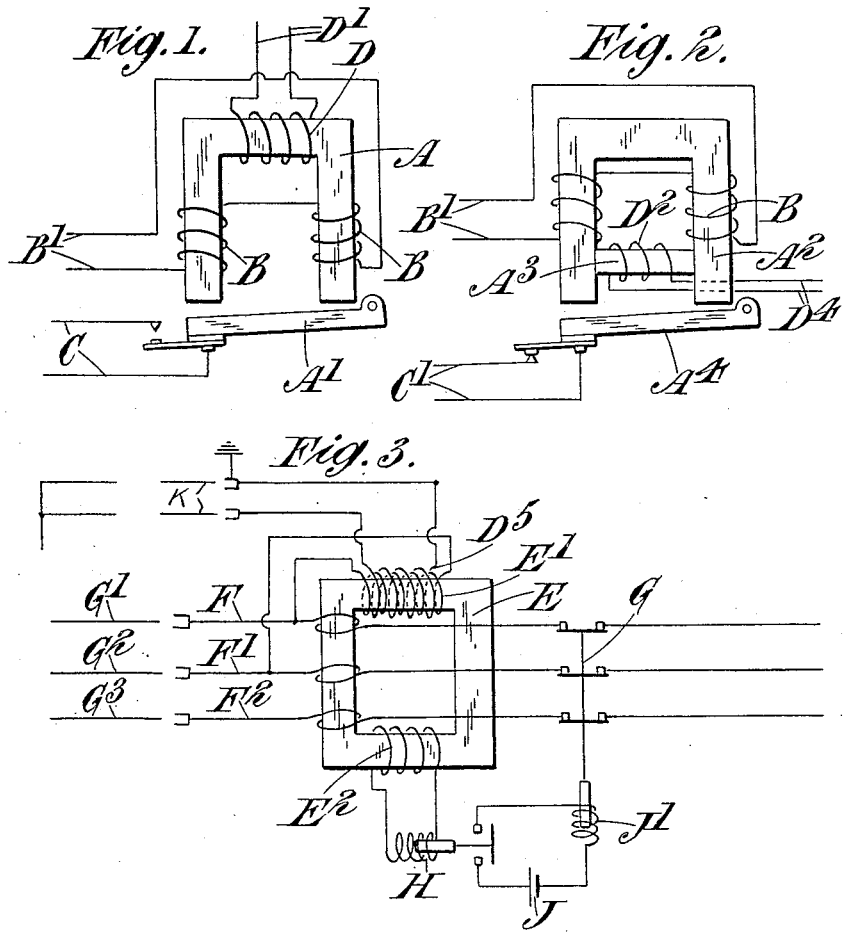

1,667,655

UNITED STATES PATENT OFFICE.

HENRY WILLIAM CLOTHIER, OF WALLSEND-ON-TYNE, AND WILLIAM ANTHONY AMBROSE BURGESS, OF MONKSEATON, ENGLAND, ASSIGNORS TO A. REYROLLE & COMPANY LIMITED, OF HEBBURN-ON-TYNE, ENGLAND, A COMPANY OF GREAT BRITAIN.

CONTROLLING OR TRIPPING APPARATUS FOR ALTERNATING-CURRENT ELECTRIC CIRCUITS.

Application filed September 17, 1925, Serial No. 57,014, and in Great Britain October 3, 1924.

This invention relates to a protective arrangement for use in conjunction with a trailing or like cable between an electromagnetically-operated switch and electrical apparatus such as portable electric apparatus for use in say a mine for coal-cutting.

There are various known forms of relays or like devices having auxiliary windings which modify or control the operation of the relay according to the condition of the circuit containing the auxiliary winding, but the persent invention is concerned solely with the use of devices of this general type as part of a protective arrangement for an alternating current electric circuit containing a trailing or like cable provided with an earthed pilot circuit between an electromagnetically-operated switch and electrical apparatus. It is generally known to be desirable to provide in conjunction with the trailing cable some means whereby the gate end or like switch is opened, or if open cannot be closed, if the earthed pilot circuit is incomplete.

According to the present invention there is employed, in combination with the earthed pilot circuit of the cable, an electromagnetic tripping device or relay for the switch having a magnetizing or operating winding and also having an auxiliary winding in circuit with the pilot circuit, such auxiliary winding being normally short-circuited by the pilot circuit so that when thus short-circuited the flux due to the magnetizing winding is modified so that the tripping device does not operate. The auxiliary winding may be on the magnetic core of a relay, the magnetizing winding of which is energized from the supply mains so that the relay tends to attract an armature controlling the tripping circuit of the gate end switch. The auxiliary winding forms part of the earthed pilot circuit and when that circuit is closed the current induced by the magnetizing winding in the auxiliary winding weakens the magnetic flux due to the magnetizing winding to such an extent that the armature of the relay will not be attracted and thus the tripping circuit for the gate end switch will not be closed.

Again, the auxiliary winding forming part of the earthed pilot circuit may be on a limb or portion of the magnetic core of the relay which affords a shunt or alternative path for the flux, the auxiliary winding being so arranged that when its circuit is closed the effect is to reduce the flux in the shunt path and thus cause a relative increase of flux through the main magnetic circuit and attract the armature of the relay. In this case the opening of the earthed pilot circuit containing the auxiliary winding will allow the flux due to the magnetizing winding to pass through the shunt path and consequently weaken the flux through the main path so that the armature controlling the tripping circuit will not be attracted or will cease to be attracted.

Again, the auxiliary winding may be on the magnetic core of a transformer furnished with a primary winding energized from the supply mains and having a secondary winding which controls the tripping circuit. In such a case the effect of the auxiliary winding, which as before forms part of the earthed pilot circuit, will be to control or modify the effect of the primary winding upon the secondary winding and thus to cause the operation of the tripping circuit under the appropriate conditions.

In one application of the invention the auxiliary winding is upon the core of an earth-leakage or core-balance transformer through which the three phase conductors pass. This core has a primary winding connected say between two of the phases and a secondary winding in circuit with the operating coil of an earth-leakage relay controlling a tripping circuit.

The auxiliary winding is in circuit with the earthed pilot circuit as before and when that circuit is closed, i. e. in the normal operating condition, the flux due to the primary winding is practically neutralized by the closed auxiliary winding and the secondary winding thus does not operate the relay. The opening of the earthed pilot circuit allows the flux due to the primary winding to have full effect upon the secondary winding and the relay consequently operates.

In the accompanying drawings,

Figures 1 and 2 are diagrams merely indicating two known alternative forms of circuit-controlling or tripping devices such as may be used according to this invention, and Figure 3 shows the circuit-controlling or tripping device in the form of a transformer and used according to this invention in conjunction with a three-phase cable with an earthed pilot circuit and a gate end switch.

With reference first to Figure 1, A is the magnetic core of a relay having an operating winding B forming part of a circuit $B^1$ which according to this invention would be connected to the supply mains and when energized would cause the armature $A^1$ to be attracted and complete a tripping circuit C. Such circuit might for instance be similar to the circuit $J J^1$ of Figure 3. The auxiliary winding is shown at D in Figure 1 and it forms part of a circuit $D^1$ which would be joined to or form part of the earthed pilot circuit such as is shown at K in Figure 3. Thus if the earthed pilot circuit were not complete the auxiliary winding D would be open-circuited and the operating winding B would cause the armature $A^1$ to be picked up, thus closing the tripping circuit. If on the other hand the earthed pilot circuit were complete, the auxiliary winding D would be closed and would then tend to weaken the flux due to the operating winding B to such an extent that the armature $A^1$ would not be lifted and thus the tripping circuit would not be closed.

The device shown in Figure 2 is intended to be connected in the various circuits and to operate in a way generally similar to that described with reference to Figure 1, but in this form the core $A^2$ is provided with a magnetic shunt path $A^3$ round which the auxiliary winding $D^3$ is wound. In this construction when the circuit $D^4$ of the auxiliary winding $D^2$ is completed by the closing of the earthed pilot circuit, the current induced in the auxiliary winding $D^2$ may be arranged to oppose or weaken the flux in the shunt path $A^3$ and thus increase the flux from the poles of the core $A^2$ through the armature $A^4$. This armature may be assumed in such circumstances to rise and open the tripping circuit $C^1$. This form of construction may also be used with the known mechanical forms of low volt tripping devices in which the tripping lever is mechanically connected to the armature.

In Figure 3 the circuit-controlling or tripping device has the form of an earth-leakage or core-balance transformer having a core E acted upon in a well known way by each of the conductors F, $F^1$, $F^2$ of a three-phase supply cable. G is a gate end switch and a trailing cable having three conductors $G^1$, $G^2$, $G^3$ leads to some apparatus, for instance a motor (not shown) at the other end. The transformer has a primary winding $E^1$ connected between the two phase conductors F and $F^1$ and a secondary winding $E^2$ in circuit with a relay H controlling a tripping circuit comprising a battery J and a trip coil $J^1$ acting to open the gate end switch G. The trailing cable is provided with an earthed pilot circuit one end of which is shown at K, the other end being assumed to be connected to the earthed casing of the motor or other apparatus. The conductors $G^1$, $G^2$ and $G^3$ and the pilot circuit are connected at each end by the usual plug and socket or like devices. In the pilot circuit K is an auxiliary winding $D^5$ acting to control or modify the action of the primary winding $E^1$. For instance, if the earthed pilot circuit K is open the effect on the secondary winding $E^1$ may be arranged to have sufficient inductive effect on the secondary winding $E^2$ as to cause the relay H to operate and open the switch G, but if the earthed pilot circuit is closed the auxiliary winding $D^5$, then short-circuited, may damp or modify the effect of the primary winding $E^1$ and prevent the opening of the switch.

What we claim as our invention and desire to secure by Letters Patent is:—

1. In an electric protective arrangement for a trailing cable between an electromagnetically-controlled switch and electrical apparatus, the combination with the earthed pilot circuit of the cable of an electromagnetic tripping device for the switch having a magnetizing or operating winding, and also having an auxiliary winding in circuit with the pilot circuit, such auxiliary winding being normally short-circuited by the pilot circuit for the purpose described.

2. In an electric protective arrangement for a three-phase trailing cable between an electromagnetically-controlled switch and electrical apparatus, the combination with the earthed pilot circuit of the cable, of an electromagnetic tripping device for the switch including an earth-leakage or core-balance transformer through which the three phase conductors pass from the switch, said transformer being provided with three windings, a primary winding connected between two of the phases, a secondary winding, and an auxiliary winding normally short-circuited by the earthed pilot circuit and acting in conjunction with the secondary winding to control the switch.

In testimony whereof we have signed our names to this specification.

HENRY WILLIAM CLOTHIER.
WILLIAM ANTHONY AMBROSE BURGESS.